F. B. HALL.
GARAGE.
APPLICATION FILED OCT. 1, 1915.

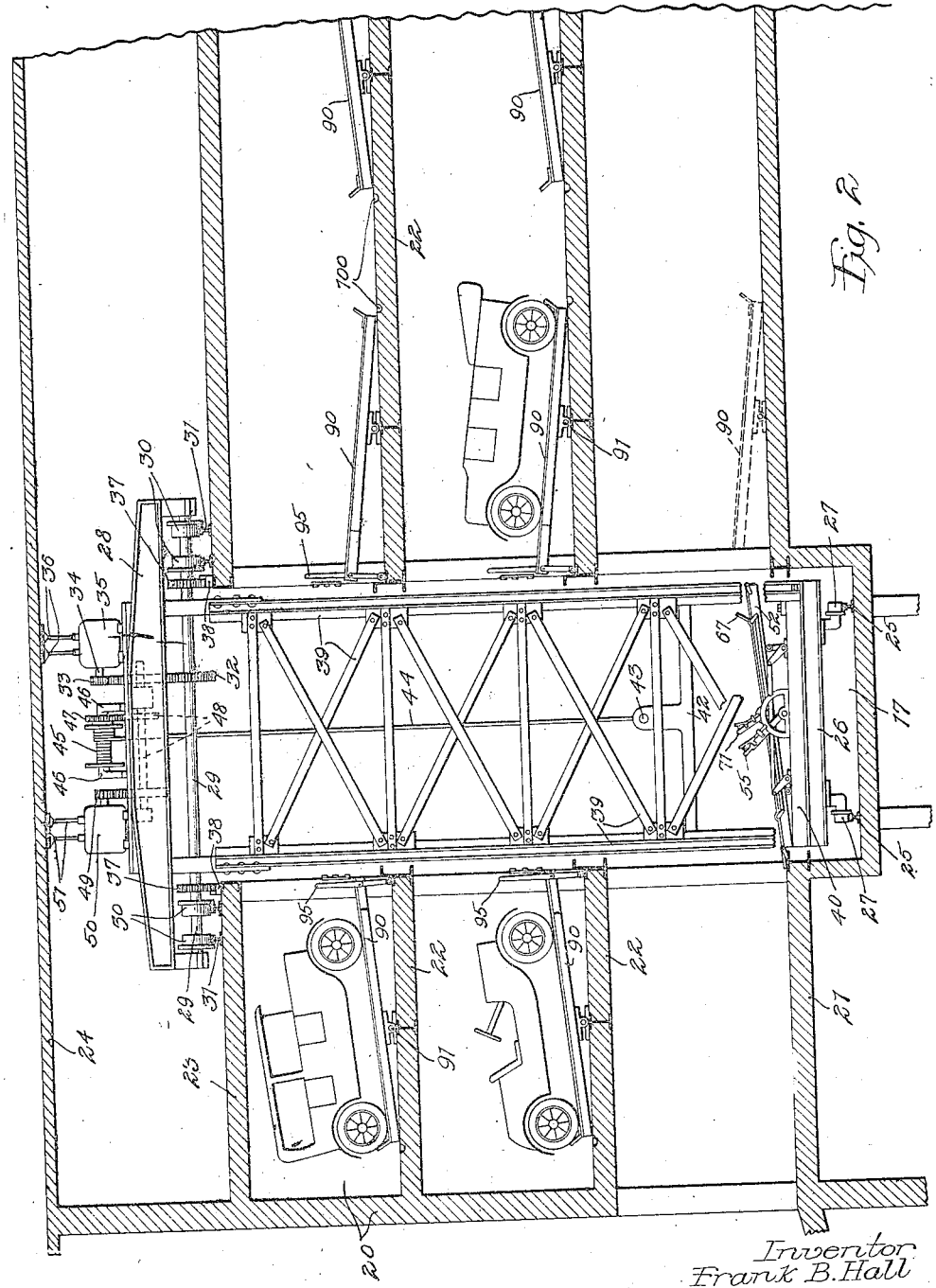

1,288,567.

Patented Dec. 24, 1918.
6 SHEETS—SHEET 3.

Inventor
Frank B. Hall
By Brown, Hanson & Boettcher
Attys

F. B. HALL.
GARAGE.
APPLICATION FILED OCT. 1, 1915.

1,288,567.

Patented Dec. 24, 1918.
6 SHEETS—SHEET 4.

Inventor
Frank B. Hall
By Brown, Hanson & Boettcher
Attys.

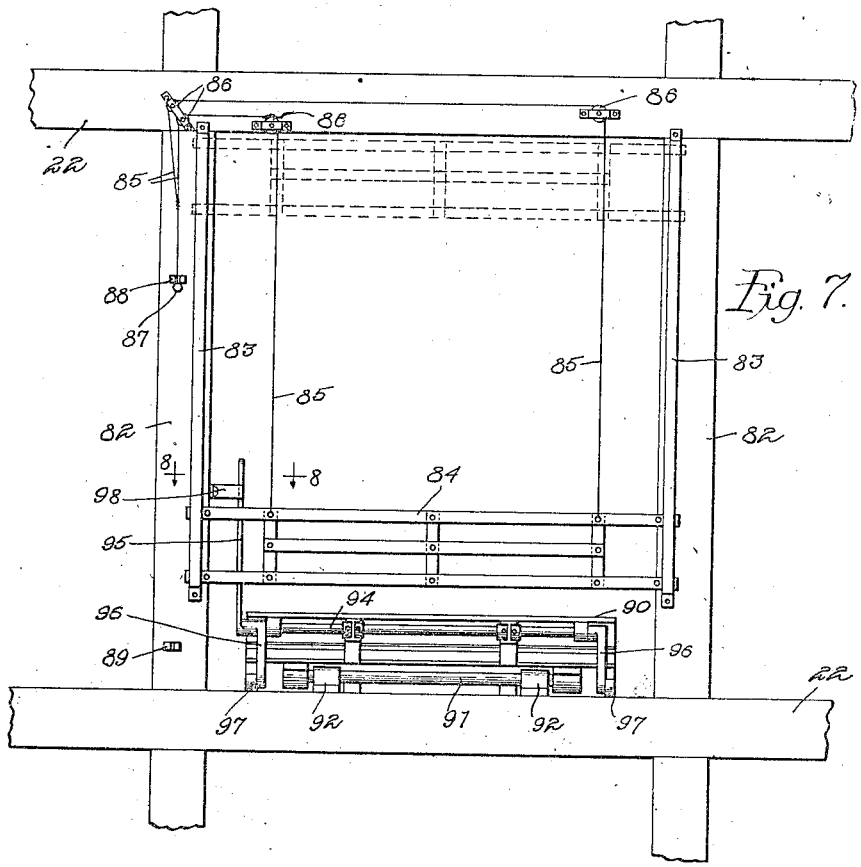

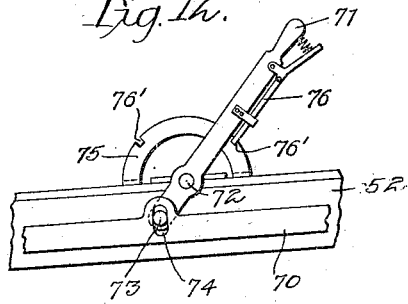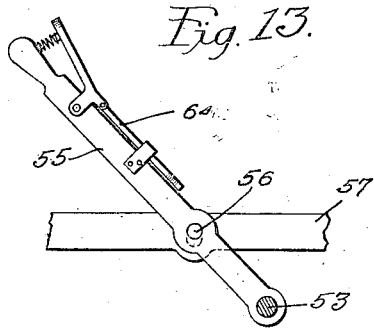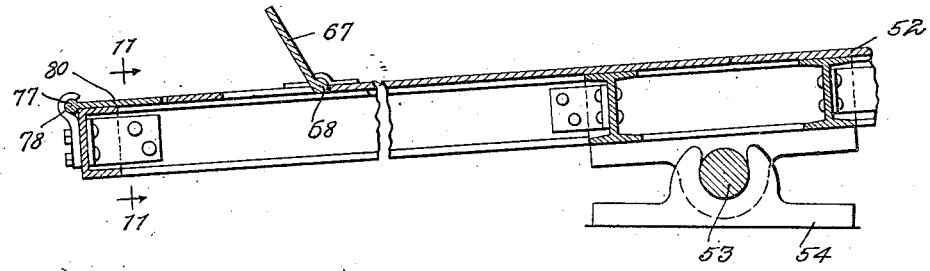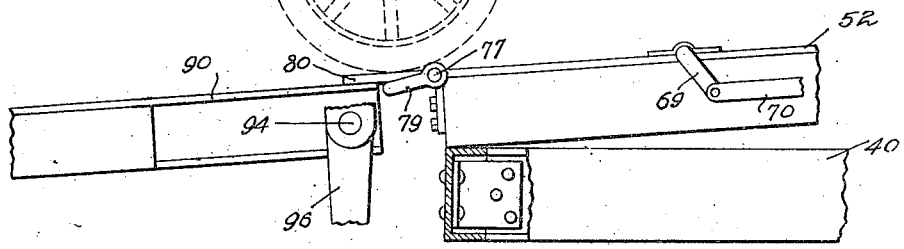

UNITED STATES PATENT OFFICE.

FRANK BARR HALL, OF NEWTON FALLS, OHIO.

GARAGE.

1,288,567.  Specification of Letters Patent.  Patented Dec. 24, 1918.

Application filed October 1, 1915. Serial No. 53,567.

*To all whom it may concern:*

Be it known that I, FRANK B. HALL, a citizen of the United States, residing at Newton Falls, in the county of Trumbull and State of Ohio, have invented a certain new and useful Improvement in Garages, of which the following is a full, clear, concise, and exact description, reference being had to the accompanying drawings, forming a part of this specification.

My invention relates to building construction and its purpose is to provide a building, commonly known as a "public garage", in which a large number of vehicles, such as automobiles, may be housed with a maximum of economy in floor space and with a maximum efficiency in respect to accessibility and convenience in inward and outward traffic.

In cities, particularly those of considerable size, where many automobiles are left for the day in the congested business district, garages are provided for the accommodation of such vehicles, and considerable numbers are thus taken care of. However, in the ordinary buildings provided for such purposes, not only is the floor space extremely limited, relative to the ground occupied, but the amount of available space for storage purposes is greatly cut down in order that the vehicles may be accessible in whatever order desired and in order that inward and outward traffic may be possible. If the floors are crowded, it is frequently necessary to move several vehicles in order to get a particular one and this not only involves inconvenience and consumes considerable time, but it also obstructs traffic and halts the entry of further vehicles while such certain car is being removed.

It is the object of my invention to eliminate the difficulties set forth in the preceding paragraph, to provide a garage in which a maximum of floor space is secured with a minimum utilization of ground, in which any automobile may be quickly removed without moving any other automobiles, in which the automobiles may be moved and placed with a minimum of effort, in which positions may be conveniently classified, and in which inward and outward traffic may take place simultaneously. To these ends, I provide a garage which may be of any desired number of floors, in which the car stalls are in the nature of pigeon-holes, in which the cars may enter from one direction and depart from another, in which carrying means is provided to move the cars from the entry-way to any particular pigeon-hole or stall, and in which the cars are moved for certain transfers, not by the power of the automobile itself, but by means of titlting platforms. These features I have embodied in a structure of simple design and practical erection and with them I have associated numerous devices for convenience and safety which I shall refer to as this description proceeds.

My invention is illustrated in the accompanying drawings in which—

Fig. 2 is a vertical sectional view taken approximately on the plane of the line 2, 2, of Fig. 1 and looking in the direction indicated by the arrows;

Fig. 7 is an elevational view of a stall as seen from the elevator shaft;

Fig. 8 is a detail view, being a section taken on the plane of the line 8, 8 of Fig. 7 and looking in the direction indicated by the arrows;

Fig. 9 is a view illustrating the relation between the elevator platform and the stall platform;

Fig. 10 is a detail view of the elevator platform, being a section taken on the plane of the line 10, 10 of Fig. 4 and looking in the direction indicated by the arrows;

Fig. 11 is a partial sectional view taken on the plane of the line 11, 11, of Fig. 10, and looking in the direction indicated by the arrows; and Figs. 12 and 13 are detail views of certain parts of the elevator platform mechanism.

Figure 1:
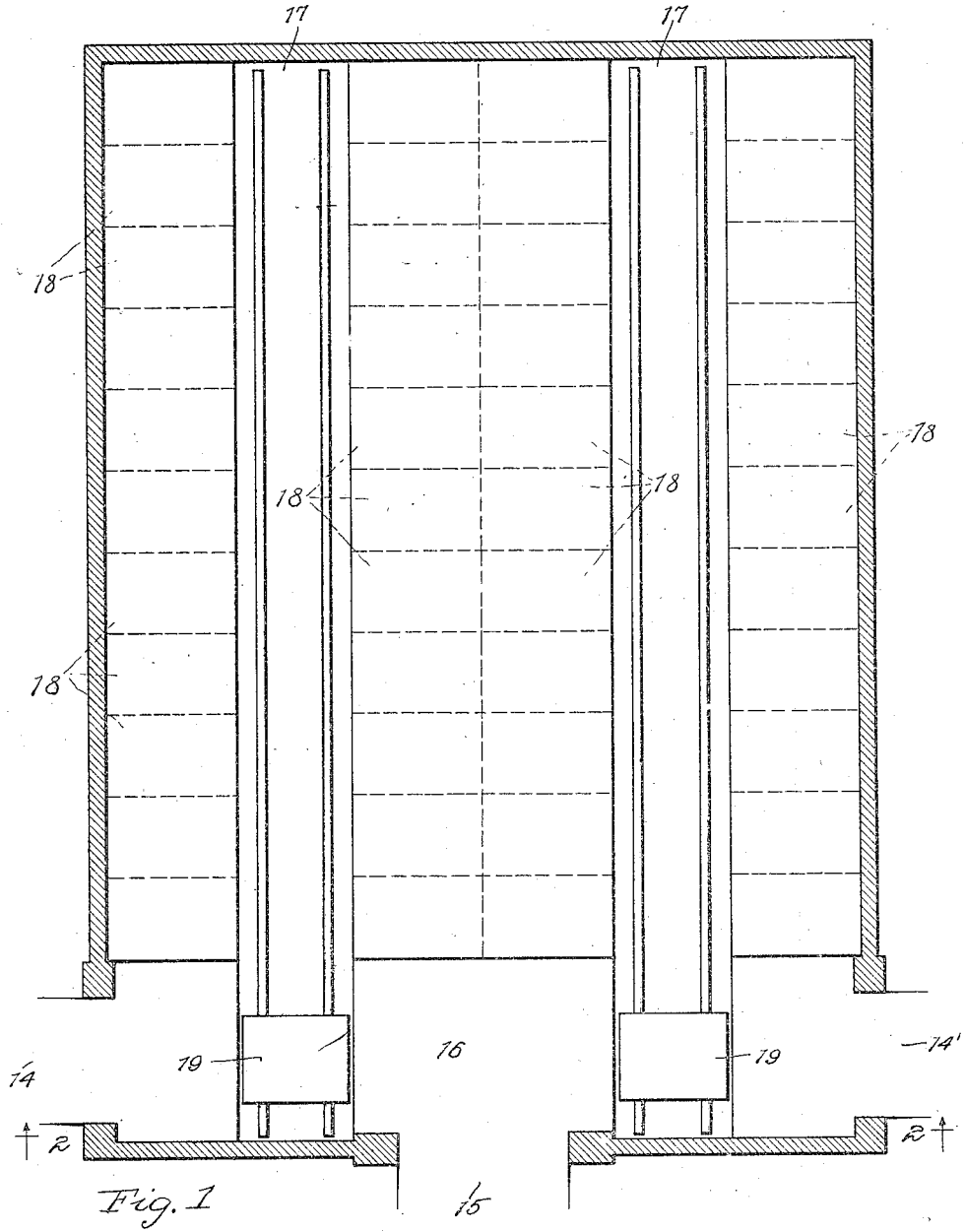
Figure 1 shows more or less diagrammatically a plan view of the garage of my invention.

Referring first to Fig. 1, it will be seen that I provide a building which preferably has doors 14, 14′ and 15 and the front passageway 16 on the main floor. At right angles to the passageway 16 and extending the entire depth of the building are two runways 17, 17 which, as will fully appear later, provide for two elongated elevator shafts. On each side of each of the runways 17 there is provided a plurality of automobile stalls 18, 18 and it will be clear that this typical floor plan, so far as the stalls are concerned, may be repeated as often as desired, within reasonable limits, to produce a building of any suitable number of floors. The two elongated elevator shafts, to which I have referred, thus provide means for accessibility to any of the stalls and in each of these shafts I provide a traveling elevator, diagrammatically indicated at 19, which may be moved to any point in the length of the runways 17 and to any height in the elevator shaft which it defines.

The foregoing will suffice for an understanding of a general arrangement contemplated by my invention and I shall now proceed with a more detailed description. Referring to Fig. 2, it will be seen that I provide the side walls 20, 20, the main floor 21, and the additional floors 22, any number of which may be employed. The top floor 23 is utilized for the accommodation of the means for supporting and moving the elevator and the roof 24, of course, covers the entire structure. The runway 17 is provided with longitudinally extending rails 25, 25, which form a track for the car 26, having wheels 27, 27 running upon the rails.

A traveling carriage 28 is provided upon the top floor, this carriage being mounted upon shafts 29, 29, which, in turn, are provided with wheels 30, 30, running upon the rails 31, 31, set upon the top floor, the carriage thus spanning the elevator shaft and being capable of movement from one end to the other thereof. A gear 32 secured upon the shaft 29 is operatively connected with the pinion 33 on the shaft 34 of the electric motor 35 which may receive its power by means of trolley wires 36, the circuit of which may be controlled in any suitable manner, as hereinafter pointed out. Also secured upon the shaft 29 are the two pinions 37, 37 which coöperate with racks 38, 38 mounted upon the floor 23, as shown. It will thus be seen that when the motor 35 operates, the carriage, due to the operation of the rack and pinion mechanism, will move longitudinally of the elevator shaft. Extending between the carriage 28 and the car 26 is the structural framework 39 which guides the elevator cage in its vertical movement in a manner to be described.

Figure 4:
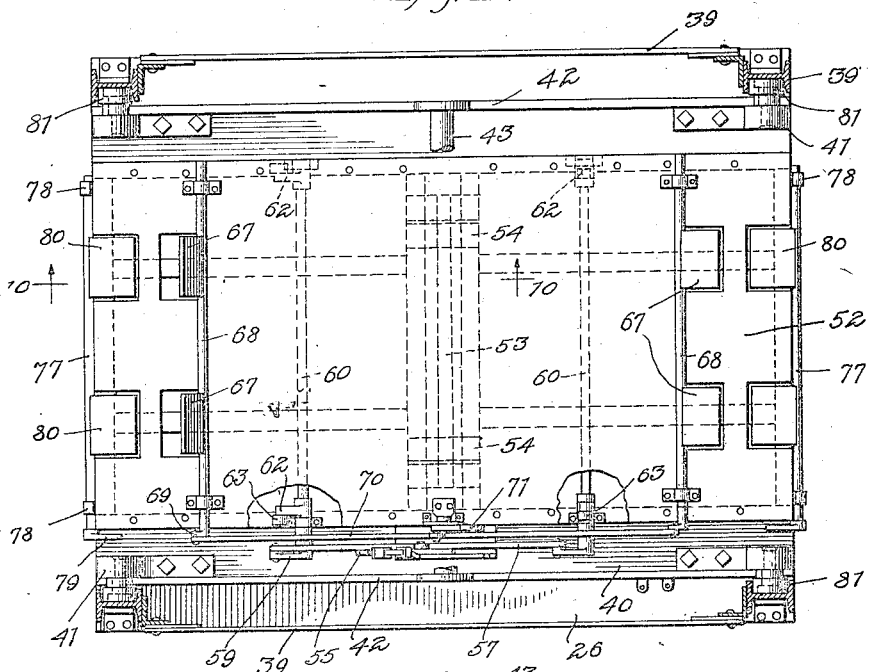
Fig. 4 is a plan view of the traveling elevator.
Figure 3:
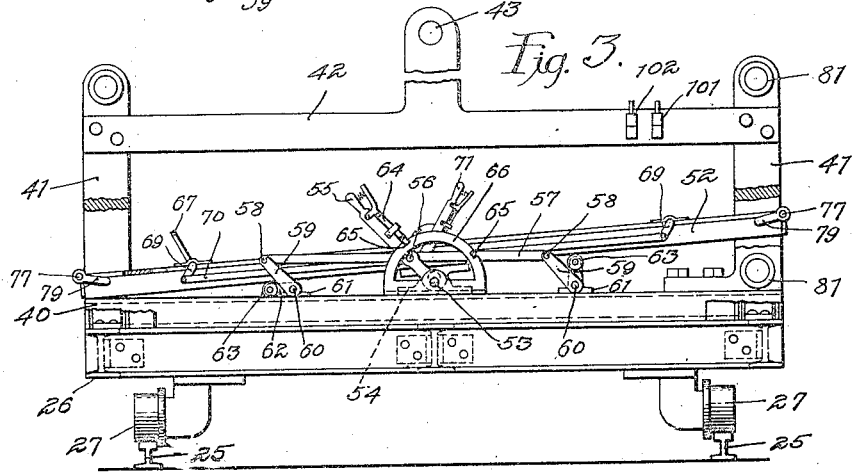
Fig. 3 is an elevational view of the traveling elevator, which I employ.

The elevator cage, shown in detail in Figs. 3 and 4, comprises the base 40, which normally rests upon the car 26, the uprights 41, and the upper cross-pieces 42, 42, which are joined by the cross-bar 43 to which the cable 44, shown in Fig. 2, is secured. This cable passes upwardly to and is wound upon a drum 45 properly journaled in supports 46, 46, this drum having a gear 47 which, through intermediate gearing and shafting 48, is operatively connected with the pinion 49 on the motor 50 set upon the carriage 28. The motor 50 derives its electric power from the trolley arrangement 51 which may be controlled in any convenient manner as hereinafter described.

The elevator cage is provided with a tilting platform 52, this platform being pivoted at 53 in the bearings 54, secured upon the top of the base 40 of the cage. Also pivoted at 53 is an operating lever 55 to which is pivoted at 56 a shifting bar 57. Each end of the shifting bar 57 is pivoted at 58 to an arm 59 secured upon a shaft 60 set in bearing pieces 61 also mounted upon the top of the base of the cage. Also secured upon the shaft 60 is an arm 62 which carries a roller 63, the arrangement being such that when the bar 57 is moved to one side or the other the roller arm will be raised so that the roller will engage the under side of the platform and tilt it, it being possible in this way by moving the operating lever 55 to tilt the platform in one direction or the other about the pivot 53. In order to hold the platform in either position the operating lever 55 is provided with latch mechanism 64 adapted to coöperate with one of two slots 65, 65, in a sector 66 mounted upon the base of the cage. As illustrated in Fig. 13, there is possible a slight relative movement between the bar 57 and the operating lever 55 in order to compensate for movement about different centers.

Near each end of the platform 52 a pair of back-stops 67, 67 is provided, these back-stops being separated to correspond to the usual distance between automobile wheels. These back-stops are mounted upon an oscillating shaft 68 and are adapted to occupy two positions, either flush with the floor of the platform, to form a part thereof, or extending upwardly, as illustrated in Fig. 10. Each of the shafts 68 is provided at the end with a crank arm 69 and the two crank arms 69, 69, are connected together by a rod 70. An operating lever 71 pivoted to the platform at 72, as clearly shown in Fig. 12, has a downwardly extending portion which carries a pin 73 engaging in a slot 74 in the rod 70, it being thus possible by means of the operating lever 71 to raise the back-stops at one end of the platform and lower those at the other end of the platform simultaneously. In order that the operating lever 71 may be held in either position a sector 75 is provided and latching mechanism 76 is carried by the lever and coöperates with the notches 76', 76', in the sector.

At each end of the platform 52 a shaft 77 is mounted in bearings 78, 78, this shaft being provided with a crankhandle 79. Each of the shafts carries a pair of riding plates 80, 80, which are thus adapted to occupy two positions, either flush with the floor of the platform or the thrown-out position, illustrated in Fig. 9, for a purpose which will be described presently. It will be seen that the elevator cage is guided in the channel irons which form the uprights of the guiding structure 39 by means of guiding rollers 81, 81.

I shall refer now to the stall structure which I employ. Reference to Fig. 7 will show that the floors 22, 22, are separated by uprights 82, 82 which are suitably separated so as to permit the passage of a car therebetween. Vertical guiding strips 83, 83 are secured in position upon the uprights 82, 82, as illustrated in Fig. 7, these guiding strips being for the purpose of guiding a gate 84 normally disposed by its own weight at the bottom of the guides, a short distance above the floor. The gate is raised by means of cables 85, 85 passing over pulleys 86, 86 and terminating in a finger piece 87. The finger piece is adapted to be held either in the upper catch 88 or the lower catch 89, as illustrated in Fig. 7.

Figure 5:
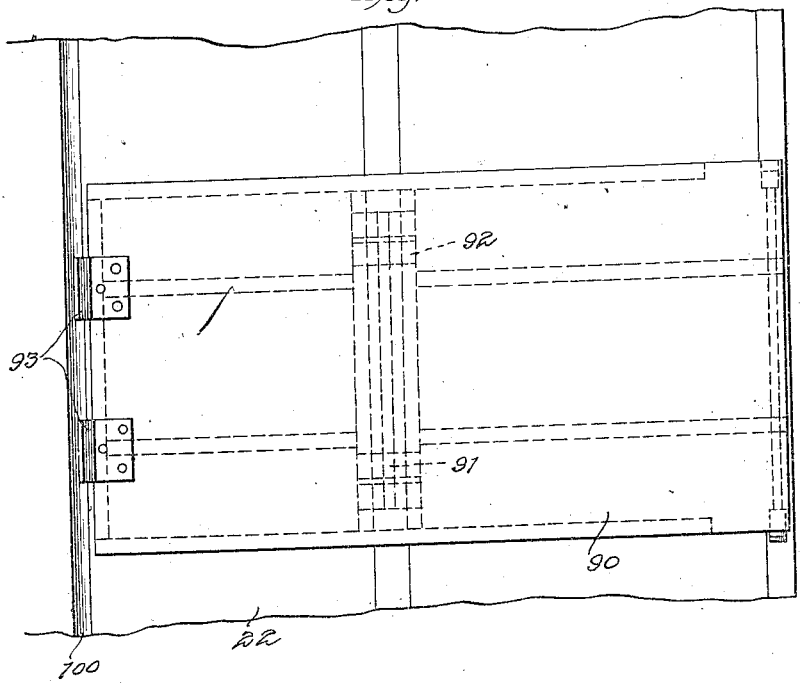
Fig. 5 is a plan view of a stall.
Figure 6:
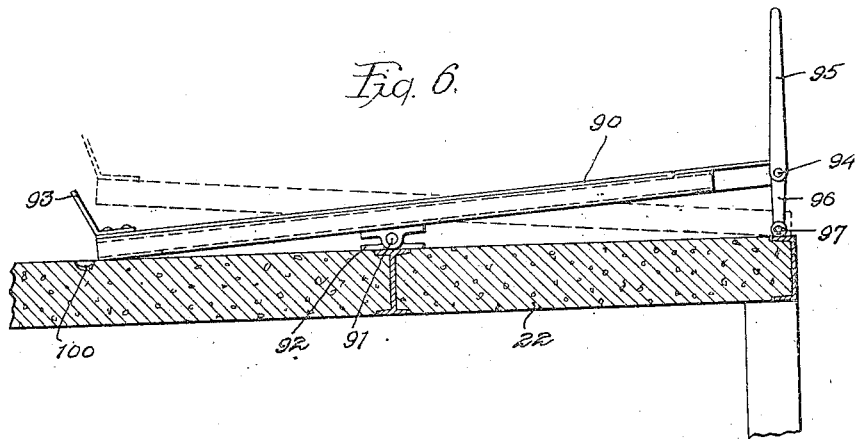
Fig. 6 is an elevational view of a stall.

Referring now to Figs. 5 and 6, it will be seen that there is pivoted in each stall a tilting platform 90. The platform is mounted upon the pivot shaft 91 carried in suitable bearings 92, secured to the floor. As this description proceeds I shall refer to the front and rear of this platform and it is to be understood that I refer to that part nearest the elevator shaft as the front. It will be noted that the pivot 91 is not located centrally relative to the platform 90, but that, on the other hand, it is located more toward the back than toward the front, this having a purpose which will be described later. The rear of the platform 90 is provided with a pair of backstops 93, 93 spaced apart a distance corresponding with the usual tread of an automobile. At the front of each platform 90 a shaft 94 is provided and an operating lever 95 is secured on this shaft. A pair of downwardly extending arms 96 is also secured to this shaft, each of these arms being provided at the bottom with a roller 97. It will be seen that when the operating lever 95 is in vertical position the roller 97 engages the floor in such a way that the arm 96 supports the forward end of the platform and consequently tilts the platform rearwardly, the proportions being such that when the operating lever 95 is in the position shown in Fig. 6 in full lines the rear end of the platform rests upon the floor. When the operating lever 95 is turned in a clockwise direction (Fig. 6) the platform is tilted forwardly in the position shown in dotted lines.

In Fig. 8 I have illustrated exemplary means for maintaining the operating lever 95 in vertical position when such action is desired. Secured to the side of the corresponding upright 82 is a spring-catch 98, this spring-catch being provided with a pocket 99 for the reception of the lever 95, as illustrated in Figs. 7 and 8. It is assumed that it will be possible for the operator to move the top of the lever 95 slightly to the right (Fig. 7) in order to release it from the spring-catch when it is desired to lower the forward end of the platform. It will be seen that in this connection I provide another feature of safety. The lever 95 is so disposed that when it is in vertical position it is behind the gate 84 and it is impossible to release the lever 95 and lower the platform until the gate 84 has been raised. At the rear end of each stall a trough 100 is provided for drainage purposes.

I shall now proceed with a description of the use of the garage of my invention. It will be understood that Figs. 1 and 2 show an exemplary arrangement. Obviously, different floor plans, particularly as to the arrangement on the first floor for the entry and departure of automobiles may be arranged. I have shown a very simple arrangement whereby the automobile may enter by one door and depart by another and although it will be clear that except for the entry and exit passageways the lower floor may also be used for storage purposes, I have not shown such an arrangement, in detail. I have, however, in dotted lines in Fig. 2, indicated what such a plan would be and it is possible that certain features of my invention may be employed in a garage built on the single floor plan. Assume that an automobile enters the garage by way of the door 14. The traveling car 26 and the entire structure moving therewith is normally set in register with the entry passageway, as illustrated in Fig. 1, for the reception of an automobile. As shown, the platform is thus normally tilted toward the entrance passageway, the operating lever 55 being then latched in its left hand position. At the same time, the operating lever 71 is latched in its left hand position so as to maintain the right hand back-stops 67 (Fig. 2) in their upper position and the left hand back-stops in their lower position flush with the platform 52. The platform is of such size that it may readily receive any standard automobile, both in length and width, and it is preferably centrally pivoted. It is possible that the building construction may be such that the I-beam, shown in Fig. 2, may properly span any gap between the floor 21 and the lowered left hand end of the platform, but in case that is not possible, the riding plates 80, 80, at that end of the platform, are thrown over by manipulating the crank-handle 79 in the position shown in Fig. 2. These plates are preferably made of sheet metal so that they form practically a flush continuation of the floor 21 and the floor of the platform 52. The automobile enters the garage by its own power and, under its own power, proceeds up the inclined platform 52 until it touches or nearly touches the raised stops 67, 67. Then the brakes of the automobile are set and the lever 71 is thrown to its right-hand position so as to lower the right hand stops 67 and raise the left hand stops, thus insuring safety in case the brakes should give way.

Two switches 101 and 102, are mounted in a convenient place upon the elevator cage, as illustrated in Fig. 3, for example. One of these switches controls the circuit of the motor 35 and the other controls the circuit of the motor 50. The operator, now that the automobile has been properly set upon the platform 52, may actuate the switch 101 to start the motor 35 in the proper direction. This results in the movement of the car, carriage 28, guiding and supporting structure 39, elevator cage and automobile, longitudinally of the runway 17, the entire arrangement running upon the tracks 25 and 31, as has been described. When this traveling structure has reached the vertical tier of stalls which contains the stall to which the automobile has been assigned, the operator stops it by actuating the switch to stop the motor 35, the traveling structure then resting in proper register with the tier referred to. The operator then manipulates the switch 102 to start the motor 50 and this results in the winding of the cable 44 upon its drum and the consequent raising of the elevator cage. The elevator is then raised to the desired floor and the cage is then directly in front of the stall which is to receive the automobile. Normally, in an empty stall, the tilting platform 90 is tilted rearwardly. The operator raises the gate 84 and brings the elevator to such a height that the lower end of the platform 52 is opposite the upper end of the platform 90. The rider plates 80, 80 are then thrown out so as to bridge the gap between the lower end of the platform 52 and the upper end of the platform 90 and the automobile has then a continuous surface, comprising the platform 52, the rider plates, and the platform 90 upon which to ride, the platform 90 being a continuation of the platform 52 and being tilted preferably to approximately the same degree. In each case, the amount of tilt is so determined that it is possible for the weight of the automobile to cause it to move down the incline when the brakes are released.

The stall now being ready for the reception of the automobile, the brakes of the automobile are released and the left hand back stops are lowered by moving the operating lever 71 to its left hand position, the resulting condition being shown in Fig. 9. The automobile then moves down the incline by its own weight until it reaches the back-stops 93 on the platform 90.

In the foregoing the presumption has been that a car entering by way of the door 14 was to be assigned to a stall on the left hand side of the elevator shaft. It will be obvious that if the car is assigned to a stall on the right hand side of the elevator shaft the operator will shift the lever 55 to the opposite position and then the same mode of operation, as has been described, with the proper manipulation of the back-stops on the elevator platform, will ensue.

I shall now describe how an automobile is removed from the garage. The elevator cage is moved horizontally and vertically to the proper position in front of the stall wherein the car to be removed is stored, the receiving end of the platform 52 being raised to its upper position and, by the movement of the elevator, being brought into line with the lower position of the front end of the stall platform 90. In this position it may be unnecessary to use the rider plates 80, since the cross-beam construction of the building itself may properly fill the gap. However, the rider plates may be utilized if necessary or desirable. Here again the idea is to dispose the parts so that the stall platform and the elevator platform will form a substantially flush unbroken surface, both tilting in the same direction. The elevator cage now having been brought to position to register with the stalls from which the automobile is to be removed, the operator raises the gate and, releasing the operating lever 95, pulls that lever toward him. Here, since the off-center position of the pivot of the platform 90 is intended to distribute the weight of the car unequally, the front of the platform will lower by its own weight and the weight of the car and all that the operator does with the lever 95 is to guide and moderate this lowering movement. However, if, notwithstanding this provision, the greater proportion of the weight is to the rear of the pivot 91, the operator may manipulate the lever 95 by pulling it toward him and overcoming the overbalancing effect. Either operation is possible and entirely practical. It is my intention, however, to have the pivot sufficiently far back so that a car, even with a short wheel base, will have the greater proportion of its weight to the front of the pivot. The brakes being released, the automobile is at liberty to ride down the inclined surface thus formed until it engages the raised back-stops 67, 67 at the lower end of the platform 52. It may be desirable as a matter of precaution, to set the brakes on the automobiles when they have been lodged in the stalls, and if so they must of course be released before the car may ride down the incline. When the automobile reaches the lower stops on the platform 52, the brakes are again set and the elevator cage is moved horizontally and vertically, as may be necessary, to bring it down to the main floor and to the outlet or exit passageway. It may be that a certain portion of the main floor may be kept clear for an automobile to back and turn so that it may be sent out of either one door or the other and so that automobiles may be received by either one door or the other. On the other hand, the arrangement may be such that the automobiles always enter by one door and depart by another, as in any case the most convenient assignment is used.

I claim as new and desire to secure by Letters Patent:

1. In a garage, a stall having a platform therein tilting both ways from a level position, and a car carrying a platform tilting both ways from a level position movable toward and away from said stall.

2. In a garage, a stall having a platform therein tilting both ways from a level position, a car carrying a platform tilting both ways from a level position movable toward and away from said stall and means for tilting said platforms.

3. A car for carrying a vehicle comprising a frame, a tilting platform, back-stops near each end of said platform and means for simultaneously lowering the back-stops at one end and raising those at the other end.

4. In a garage, a stall having a platform therein tilting both ways from a level position, a car carrying a platform tilting both ways from a level position movable toward and away from said stall and rider plates for bridging the gap between said platforms.

5. In a garage, a stall having a platform therein tilting both ways from a level position, a car carrying a platform tilting both ways from a level position movable toward and away from said stall and rider plates for bridging the gap between said platforms, said plates being movable into and out of operative position.

6. A stall having a pivoted platform therein, means for tilting said platform, and a gate for said stall, said gate when closed preventing the operation of the tilting means.

7. In a garage, a plurality of stalls arranged in vertical and horizontal rows, an elevator structure movable horizontally alongside said stalls, an elevator cage movable vertically in said structure, a tilting platform in said cage and a tilting platform in each of said stalls, said tilting platform of said cage being adapted to form an extension of the tilting platform of any of said stalls.

8. In a garage, a plurality of floors divided into stalls, an elongated elevator shaft, tracks at the bottom of said shaft, a car running on said tracks, tracks above the top of said floors, a carriage on said last named tracks, said carriage bridging said shaft, a guiding structure between said car and carriage, a cage mounted for vertical movement in said structure, and a tilting platform in said cage and in each of said stalls, said tilting platform of said cage being adapted to form an extension of the tilting platform of any of said stalls.

9. In a garage, a plurality of floors divided into stalls, an elongated elevator shaft, tracks at the bottom of said shaft, a car running on said tracks, tracks above the top of said floors, a carriage on said last named tracks, said carriage bridging said shaft, a guiding structure between said car and carriage, a cage mounted for vertical movement in said structure, and a tilting platform in said cage and in each of said stalls, each of said stalls having a gate accessible from said shaft, and said tilting platform of said cage being adapted to form an extension of the tilting platform of any of said stalls.

10. In a garage, a plurality of stalls arranged in vertical and horizontal rows, a carrier movable vertically and horizontally of said stalls, a tilting platform on said carrier, and a tilting platform in each of said stalls, said tilting platform of said carrier being adapted to form an extension of the tilting platform of any of said stalls either inclined downwardly into the stall or inclined downwardly out of the stall so that an automobile may move by gravity into the stall when the associated platforms are in one position or out of the stall when they are in the other position.

11. In a garage, a plurality of stalls, arranged in vertical and horizontal rows, a carrier movable vertically and horizontally of said stalls, a tilting platform on said carrier, and a tilting platform in each of said stalls, said tilting platform of said carrier being adapted to form an extension of the tilting platform of any of said stalls either inclined downwardly into the stall or inclined downwardly out of the stall so that an automobile may move by gravity into the stall when the associated platforms are in one position or out of the stall when they are in the other position, the tilting platforms of the stalls being so hinged that the inner ends thereof are overbalancing when containing an automobile.

In witness whereof I hereunto subscribe my name this 25th day of September, A. D. 1915.

FRANK BARR HALL.